G. W. CRAWFORD.
WHEEL TIRE.
APPLICATION FILED JAN. 18, 1910.
955,053.
Patented Apr. 12, 1910.
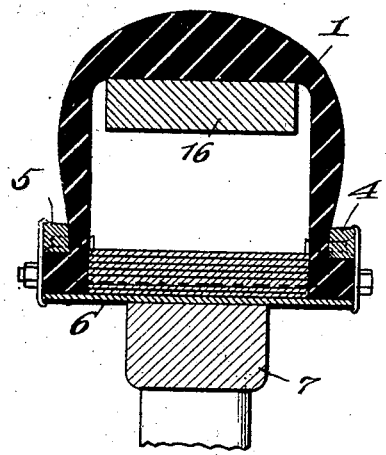
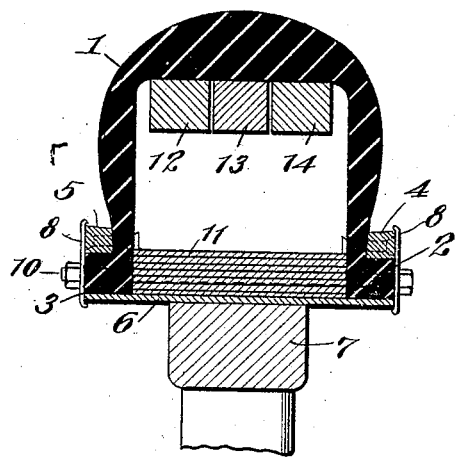
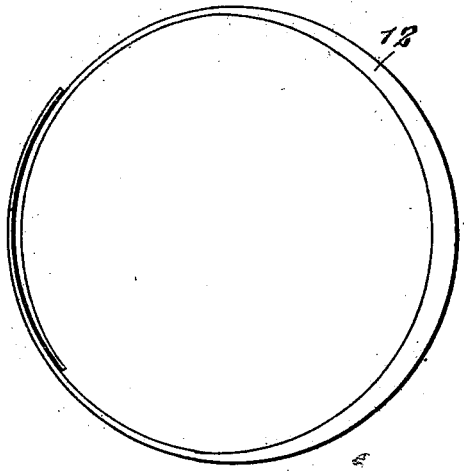
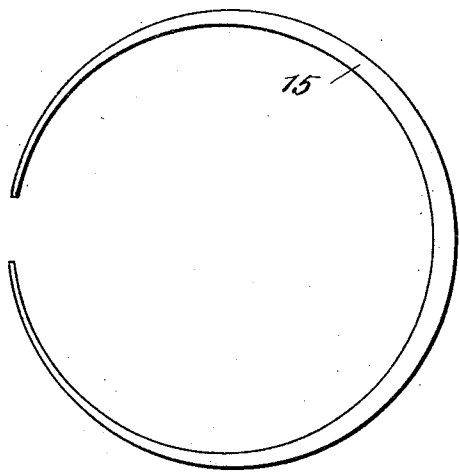
WITNESSES:
INVENTOR
George W. Crawford
BY
Nicholas M. Goodlett Jr.
ATTORNEY

UNITED STATES PATENT OFFICE.

GEORGE W. CRAWFORD, OF PERTH AMBOY, NEW JERSEY, ASSIGNOR TO THE SAFETY TIRE COMPANY, A CORPORATION OF MAINE.

WHEEL-TIRE.

955,053.  Specification of Letters Patent.  Patented Apr. 12, 1910.

Application filed January 18, 1910. Serial No. 538,589.

*To all whom it may concern:*

Be it known that I, GEORGE W. CRAWFORD, a citizen of the United States, and a resident of Perth Amboy, county of Middlesex, and State of New Jersey, have invented certain new and useful Improvements in Wheel-Tires, of which the following is a specification.

This invention relates to wheel tires designed and adapted for use on vehicle wheels.

It is the purpose of the invention to provide a tire in which the shoe shall be supported by an efficient and durable form of spring means thus doing away with pneumatic tubes or chambers and the objections incident thereto.

The invention consists of the features hereinafter set forth and shown in the drawings.

In the accompanying drawings forming part of this specification and in which like reference numerals designate corresponding parts,—Figure 1 is a transverse section showing the improved tire attached to the rim of a wheel. Fig. 2 is a similar view showing a modification. Fig. 3 is a side elevation of one of the split rings forming the spring support, such as is shown in Fig. 1. Fig. 4 is a similar view of a split ring in modified form.

Referring now to the particular features of the invention as shown in the drawings, 1 is a shoe of suitable material and made in channel form in cross-section. Its inner margins are provided with outwardly extending flanges 2 and 3. Surrounding these flanges are stiffening rings 4 and 5 riveted to the walls of the shoe. The rim 6 of the wheel is secured by suitable means to the felly 7 and the shoe is secured to the rim by cleats 8 held in place by bolts 10 passing through the flanges of the shoe and through the filler 11 located within the shoe and surrounding the rim 6.

12, 13 and 14 are three circumferential spring members normally under tension and together forming an interior spring support for the tread of the shoe. These spring members are specially formed for the purpose of distributing the strain upon the springs when the latter are under compression incident to their use. For this purpose each spring member comprises a split ring which decreases in cros-section through substantial portions of the ring's length from an intermediate portion to or toward the ends. This decrease in cross-section is preferably in the form of a gradual taper, as shown in the drawings.

It has been found in actual trial that where interior circumferential springs are used to support the tread of the tire, there is a tendency for the spring to break at a point midway between its ends in cases where the spring is uniform in cross-section. This tendency is overcome by decreasing the cross-section of the ring, as above described, because the strain upon the ring is thereby distributed. The ends of the split ring may be arranged to overlap, as shown in Fig. 3, or a space may be left between the ends of the split ring as is the case with the split ring 15 shown in Fig. 4.

While I prefer to employ three parallel spring members arranged side by side, as shown in Fig. 1, I do not wish to be limited either to the location of these spring members relative to each other, or to the number of the spring members. If desired, one of the spring members may be used as is shown in spring member may be used as is shown in Fig. 2. In this case the spring member 16 is substantially as wide as that of the three combined spring members, shown in Fig. 1.

What is claimed and what is desired to be secured by Letters Patent is:—

1. In a wheel-tire, the combination of a shoe; and an interior spring support for the shoe comprising a circumferential spring member normally under tension, said spring member comprising a split ring which decreases in cross-section through substantial portions of the ring's length from an intermediate portion to or toward the ends, whereby the strain on the ring is distributed.

2. In a wheel-tire, the combination of a shoe, and an interior spring support for the shoe comprising a circumferential spring member normally under tension, said spring member comprising a split ring which decreases in cross-section through substantial portions of the ring's length from an intermediate portion to or toward the ends, whereby the strain on the ring is distributed, said ring having its ends overlapping.

3. In a wheel-tire, the combination of a shoe of channel form in cross-section; a wheel rim to which the shoe is secured; and an interior spring support for the shoe comprising a circumferential spring member normally under tension, said spring member comprising a split ring which decreases in cross-section through substantial portions of the ring's length from an intermediate portion to or toward the ends, whereby the strain on the ring is distributed.

4. In a wheel-tire, the combination of a shoe; and an interior spring support for the shoe comprising a circumferential spring member normally under tension, said spring member comprising a split ring which tapers gradually through substantial portions of the ring's length from an intermediate portion to or toward the ends, whereby the strain on the ring is distributed.

5. In a wheel-tire, the combination of a shoe; and an interior spring support for the shoe comprising a circumferential spring member normally under tension, said spring member comprising a split ring which tapers gradually through substantial portions of the ring's length from an intermediate portion to or toward the ends, whereby the strain on the ring is distributed, said ring having its ends overlapping.

6. In a vehicle wheel, the combination of a wheel rim; a shoe of channel form in cross-section having stiffening rings secured thereto near its inner margins; means for securing said shoe to said rim; and an interior spring support for the shoe comprising a circumferential spring member normally under tension, said spring member comprising a split ring which decreases in cross-section through substantial portions of the ring's length from an intermediate portion to or toward the ends, whereby the strain on the ring is distributed.

7. In a wheel tire, the combination of a shoe; and an interior spring-support for the shoe comprising a plurality of circumferential spring members normally under tension, each of said spring members comprising a split-ring which decreases in cross-section through substantial portions of the ring's length from an intermediate portion to or toward the ends, whereby the strain on the ring is distributed.

In testimony whereof, I have signed my name to this specification, in the presence of two subscribing witnesses.

GEORGE W. CRAWFORD.

Witnesses:
NICHOLAS M. GOODLETT, Jr.,
IDA G. GILMORE.